(12) United States Patent
Fish

(10) Patent No.: US 11,267,614 B2
(45) Date of Patent: Mar. 8, 2022

(54) PORTABLE MULTI-COMPARTMENT STORAGE CONTAINER

(71) Applicant: Riley Fish, Boise, ID (US)

(72) Inventor: Riley Fish, Boise, ID (US)

(*) Notice: Subject to any disclaimer, the term of this patent is extended or adjusted under 35 U.S.C. 154(b) by 0 days.

(21) Appl. No.: 16/727,911

(22) Filed: Dec. 26, 2019

(65) Prior Publication Data
US 2020/0207515 A1 Jul. 2, 2020

Related U.S. Application Data

(60) Provisional application No. 62/785,062, filed on Dec. 26, 2018.

(51) Int. Cl.
| | |
|---|---|
| B65D 25/08 | (2006.01) |
| A45C 11/20 | (2006.01) |
| A45C 13/02 | (2006.01) |
| A45C 13/22 | (2006.01) |
| A47J 47/00 | (2006.01) |
| A45C 13/06 | (2006.01) |
| B65D 25/04 | (2006.01) |
| A45F 5/10 | (2006.01) |

(52) U.S. Cl.
CPC ............ *B65D 25/08* (2013.01); *A45C 11/20* (2013.01); *A45C 13/02* (2013.01); *A45C 13/06* (2013.01); *A45C 13/22* (2013.01); *A45F 5/10* (2013.01); *A47J 47/005* (2013.01); *B65D 25/04* (2013.01); *A45C 2013/223* (2013.01)

(58) Field of Classification Search
CPC ............ A47G 19/2205; A47G 19/2255; B65D 21/0228; B65D 21/023; B65D 21/0231; B65D 21/02; B65D 21/0209; B65D 21/0212; B65D 21/0217; B65D 21/0219; B65D 21/022; B65D 21/0222; B65D 21/0204; B65D 21/0201; B65D 21/0202; B65D 21/0223; B65D 81/32; B65D 81/3205; B65D 25/04; A47C 11/20; A47C 13/02; A45F 5/10; A45C 11/20; A45C 13/02
USPC ........ 220/23.83, 23.86, 4.01, 293, 300, 301, 220/298; 215/6; 206/216, 217
See application file for complete search history.

(56) References Cited

U.S. PATENT DOCUMENTS

| | | | | |
|---|---|---|---|---|
| 3,811,216 | A  * | 5/1974 | Sauey | A01K 97/08 43/26 |
| 2013/0098908 | A1 * | 4/2013 | Rances | B65D 25/04 220/4.26 |
| 2013/0111726 | A1 * | 5/2013 | Krieger | B65D 21/022 29/428 |

* cited by examiner

*Primary Examiner* — Javier A Pagan
(74) *Attorney, Agent, or Firm* — Shaver & Swanson, LLP; Scott D. Swanson

(57) ABSTRACT

A portable multi-compartment storage container with multiple compartments for storing food, beverages, and other travel items. The portable multi-compartment storage container has a first container, a medial container, and a second container that are configured to attach. The containers are separated by insertable lids to keep the contents of the containers separate. A medial connector is inserted between the first container and the medial container and a lid is configured for insertion into the medial connector to separate the contents of the medial container from the first container. The first container and the second container also have removable lids so the contents of the containers can be accessed without removal of the medial container. A handle attaches at least the first container so a user can easily grasp and transport the portable multi-compartment storage container.

16 Claims, 8 Drawing Sheets

PORTABLE MULTI-COMPARTMENT STORAGE CONTAINER

PRIORITY/CROSS-REFERENCE TO RELATED APPLICATIONS

This application claims the benefit of U.S. Provisional Patent Application No. 62/785,062, filed Dec. 26, 2018, the contents of which are hereby incorporated by reference.

TECHNICAL FIELD

The presently disclosed technology relates generally to storage containers for meals and beverages, and more specifically to a multi-storage container for storing and transporting multiple meals, beverages, utensils, or other on-the-go items.

BACKGROUND OF THE INVENTION

Regular mugs and cups aren't able to store multiple different kinds of food, snacks, silverware and accessories at one time with an ability to change into over a dozen different shapes and designs for storage. They also don't have an insert able plastic bowl for microwavable use while still being able to form a cup that can transform.

Regular lunchbox's and Tupperware® containers aren't able to provide easy accessibility on the go while still being able to transform into three different mug fluid ounce sizes on the go while staying intact. Also these containers can't become bigger and smaller to store different portions of food, accessories, and other devices when the moment arises.

Presently, there is no solution known to the inventor to being able to hold accessories, beverages, food, snacks, change, etc. for on the go use in one storage container. All while being easily accessible and have the ability to store many different items while being well insulated and microwaveable. Along with these features the inventor is unaware of any container that does all these things while still being able to transform and change with all the parts needed and used in everyday life to store food, accessories, and drink at once (no other container can use something similar to bowls, mugs, cups, plates, cup holder, and container holders in one transportable device).

SUMMARY OF THE INVENTION

The purpose of the summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the inventive concept(s) of the application, which is measured by the claims, nor is it intended to be limiting as to the scope of the inventive concept(s) in any way.

The present invention seeks to provide a solution to this problem(s) by providing a transformable drinking container that can store multiple different kinds of food, drink, accessories, supplements, medication, and change at one time without touching. It is also included that it provides easy accessibility with threads and thread inserts along each part while allowing the user to interchange pieces on the go for different storage/container sizes and shapes on the go for any situation that may arise. It is can be used for the storage of items used in everyday life since the container has multiple containers.

What is disclosed is a portable multi-compartment storage container for meals and beverages. In a preferred embodiment, the portable multi-compartment storage a a first container and a first container lid attached to top of the first container. The portable multi-compartment storage has a medial container configured for attaching to the bottom of the first container, and a second container. The second container attaches to the medial container opposite to the first container. The second container has a lid attached to the bottom of the second container. The portable multi-compartment storage has a first medial lid configured for inserting in the medial container proximate to the first container to separate the contents of the medial container from the first container. The portable multi-compartment storage preferably has a second medial lid configured for inserted in the medial container proximate to the second container. The second medial lid is configured to separate the contents of the medial container from the contents of the second container. The portable multi-compartment storage is preferably configured for holding food items and beverages.

The first container lid is preferably configured for removable attachment to the first container. The second container lid is preferably configured for removable attachment to the second container. The portable multi-compartment storage container preferably has a handle attached to at least the first container. The handle is preferably removably attached to at least the first container. The handle preferably has a plurality of tabs attached to the first container, the medial container, and the second container. A strap attaches to the plurality of tabs and is configured for being adjustable.

The portable multi-compartment storage container preferably has a medial connector configured for attaching to the first container and the medial container. The medial connector is preferably configured for attaching the second container when the medial container is removed. The first medial lid is configured for insertion into the medial connector such that when the first medial connector and first medial lid is inserted, the contents of the first container is separated from the medial container or the second container when the medial container is removed.

In a preferred embodiment, the first container is configured for attaching to the medial connector, medial container when the medial connector is removed, and the second container if the medial connector and medial container are removed.

In a preferred embodiment, the first container, the medial connector, the medial container, and the second container have threaded engagements configured for threaded attachment to each, respectively. In a preferred embodiment, the first medial lid and the second medial lid are configured for threaded attachment to the medial connector and medial container, respectively.

In a preferred embodiment, the first medial lid and the medial connector are configured for use as an eating dish, such as a plate or a bowl.

The portable multi-compartment storage container preferably is durable, insulated, and transformable to any situation (such as storing breakfast, lunch, dinner, leftovers, drinks, accessories, and change). Each of the containers are preferably configured for a fluid seal so that the contents of each container cannot leak into another container or leak out of the container. It is able to transform due to each piece having threads and/or thread inserts that allow for each part to screw onto one another to form a dozen or more different container sizes and shapes for any situation. The container is able to use two bowls, a base plate piece, and a middle container piece to form three different well insulated mug sizes and shapes.

The portable multi-compartment storage container can actually form one to four different compartments to store multiple different kinds of food, drink, accessories, and change at one time without touching. The threads on each part allow for different Tupperware® container compartment shapes for different food and accessories to be stored. It is preferably made of stainless steel which allows for the container to keep one or many different forms of food and/or drink warm or cool for long periods of time. In alternate embodiments, plastic materials such as Tupperware® or a resilient plastic material may be used. The second container is configured for the insertion of a plastic insertable bowl stored in it to allow an individual to remove the plastic bowl and microwave food then store it back into the second container to keep it warm for long periods of time while possibly traveling with their stored food or accessory of choice in the medial container The portable multi-compartment storage container can be used for all situations, including but not limited to: the gym (to store supplements), movies, school lunches, on the go parents, the office party (store chips and dip in it), college students (to store flash drives), business owners (to store business cards), hospitals (to store pills), children or adults that need medication (inhaler, epi-pen), breakfast, lunch, dinner, snacks, drinks, accessory holder, change holder. It preferably has of all the things people would use in a day while still being able to transform and hold items which is something everyone always wants. The portable multi-compartment storage container can come in different colors or customizable colors that allow for sports fans and creative people to express themselves freely by buying multiple different container colors and interchanging them to whatever cool design they want.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments is to be regarded as illustrative in nature, and not as restrictive in nature.

DETAILED DESCRIPTION OF THE EMBODIMENTS

Figure 1:
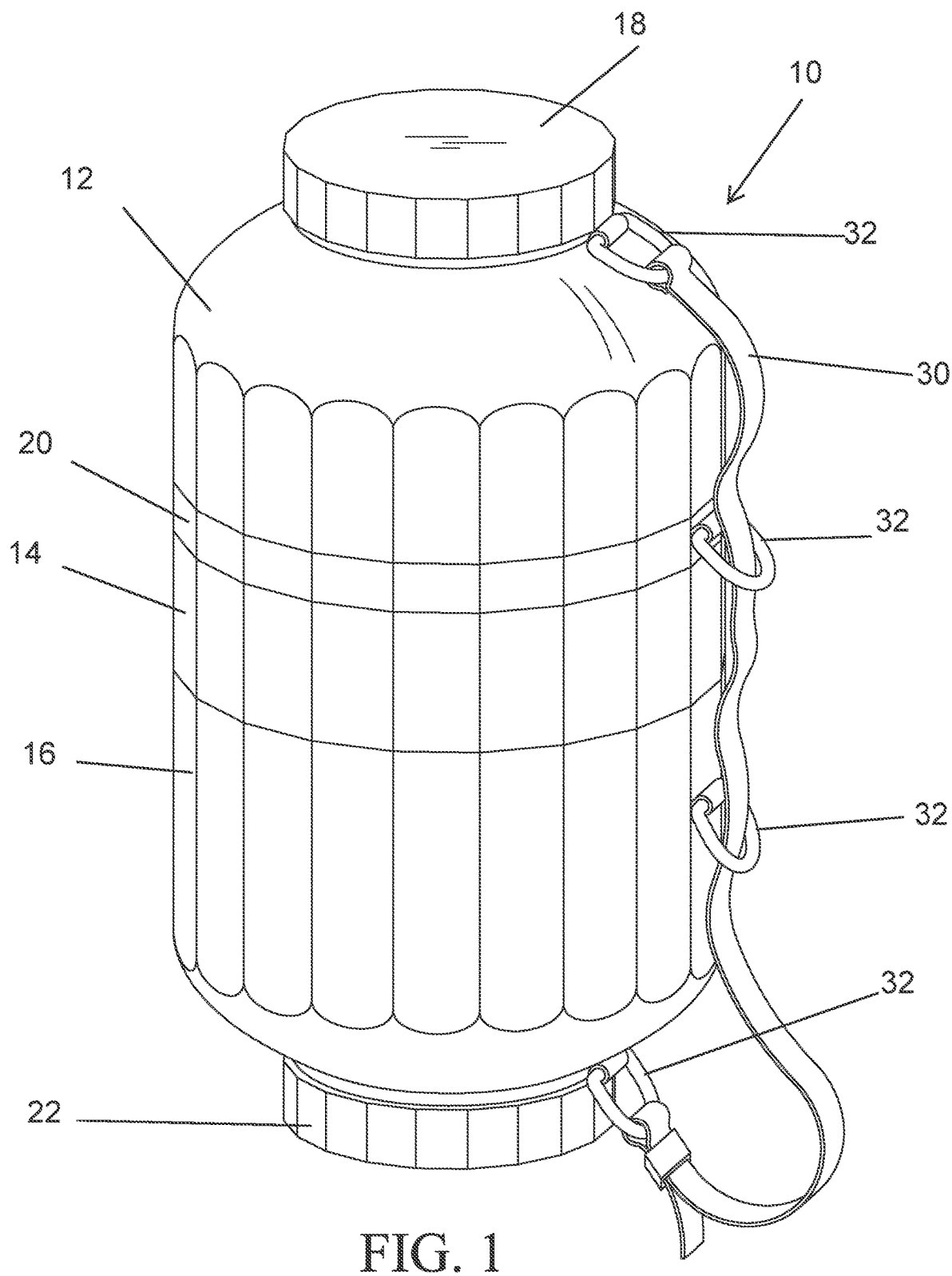
FIG. 1 is a side perspective view of an embodiment of an portable multi-compartment storage container.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

FIG. 1 illustrates perspective view of a preferred embodiment of a portable multi-compartment storage container 10. In a preferred embodiment, the portable multi-compartment storage container 10 has a first container 12, a medial container 14, and a second container 16, and a medial connector 20. A lid 18 is configured to attach to the top of the first container 12. The attachment of the lid 18 to the first container 12 is preferably by a threaded engagement. In alternate embodiments, the attachment can be made by a force fit engagement, a snap on attachment, or other attachments known in the art for fluid seal. The lid 18 is preferably generally planar so that the lid 18 can balance and support the portable multi-compartment storage container 10 if placed on a generally flat surface.

The first container 12 and second container 16 are preferably in the shape of a bowl, with the perimeter curving inward as it approaches the lids 18, 22. In alternative embodiments, the first container is cylindrical. In alternate embodiments the first container can be in a polygonal shape with multiple sides. The medial container 14 is preferably a cylindrical shape. In alternate embodiments, the medial container can be in a polygonal shape with multiple sides. The second container 16 is preferably larger in volume than the first container 14. In alternate embodiments the first container and second container are approximately the same size.

In a preferred embodiment, a medial connector 20 is attached to the first container 12. The first container 12 attaches to the medial connector 20 preferably by a threaded engagement. In alternate embodiments, the first container attaches to the medial connector by a force fit engagement, a snap on attachment, or other attachments known in the art for fluid seal.

The medial connector 20 is configured to preferably attach to the first container 12 and to the medial container 14. The medial connector 20 preferably attaches to the medial container 14 and first container 12 by a threaded engagement. In alternate embodiments, the medial connector attaches to the medial container and first container by a force fit engagement, a snap on attachment, or other attachments known in the art. The medial connector 20 is configured to attach to the second container 16 when the medial container 14 is removed (not shown).

As illustrated in the preferred embodiment depicted in FIG. 1, the medial container 14 is configured to attach to the second container 16 and the medial connector 20. The medial container 14 preferably attaches to the second container 16 and medial connector 20 by a threaded engagement. In alternate embodiments, the medial container attaches to the second container and medial connector 20 by a force fit engagement, a snap on attachment, or other attachments known in the art for fluid seal. The medial container 14 is configured to food, liquid, or to hold large items such as spoons, forks, knives, sandwich, chips, snacks, candy, epi-pen, inhaler, car keys, wallet, garage door opener, flash drive, etc. and can also be used as a bowl or Tupperware®.

The second container 16 is configured to attach a lid 22 at the bottom of the second container 16. The attachment of the lid 22 to the second container 16 is preferably by a threaded engagement. In alternate embodiments, the attachment can be made by a force fit engagement, a snap on attachment, or other attachments known in the art for fluid seal. The lid 22 is preferably generally planar so that the lid 22 can balance and support the portable multi-compartment storage container 10 if placed on a generally flat surface.

The second container 16 is configured to allow for the insertion, storage, and transportation of a plastic insertable bowl that can be used in a microwave.

Illustrated in FIG. 1 is a preferred embodiment of a handle 30. The handle 30 is preferably a strap handle and is threaded through four tabs 32 attached to the first container 12, the medial connector 20, and the second container 16. The handle 30 is configured to adjust so that a user can tighten the strap as desired for the situation. If the user desires to have a firm handle, the user can tighten the strap. Alternatively, if the user desires to have a looser handle, so that a user can sling the handle over his or her shoulder, or attach the handle to a belt or a backpack, the user can loosen the strap. In alternate embodiments, the handle can be a rigid handle attached to the first container or the second container, such as one used on coffee mugs or thermoses.

Figure 2:
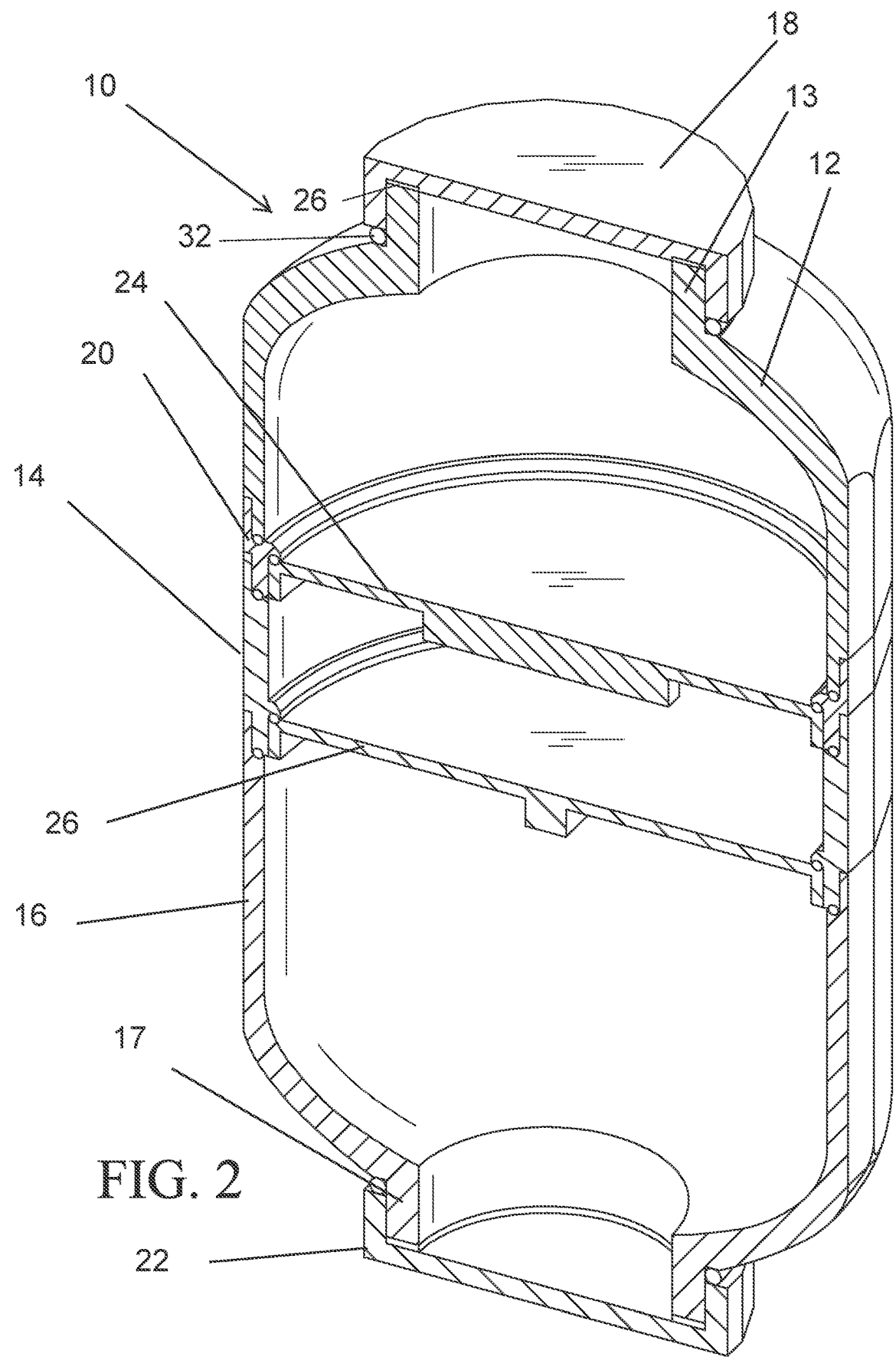
FIG. 2 is a cross sectional perspective view of the portable multi-compartment storage container as shown in FIG. 1.

Illustrated in FIG. 2 is a cross sectional view of a preferred embodiment of an portable multi-compartment storage container 10. In a preferred embodiment, the first container 12, the medial container 14, and the second container 16 generally hollow and are configured for storing and holding preferably meal and beverage items.

In a preferred embodiment, the first container 12 and second container 16 have bottle necks 13, 17 configured for attaching the lids 18, 22. The bottle necks 13, 17 can be configured with a seal 26 configured for preventing any leaking of the food or beverage contents in the containers 12, 16.

In a preferred embodiment, the portable multi-compartment storage container 10 has a first medial lid 24 and a second medial lid 26. The first medial lid 24 is configured for attaching into the interior of the medial connector 20. This attachment can be made by a threaded engagement, a force fit engagement, a snap fit engagement, or other attachments known in the art for fluid seal. The first medial lid 24 is configured for separating the meal or beverage items between the first container 12 and the medial container 14. Alternatively, the first medial lid 24 is configured for separating the meal or beverage items between the first container 12 and the second container 16 when the medial container 14 is removed.

In a preferred embodiment, the second medial lid 26 is configured for securely inserting into the medial container 14. The second medial lid 26 is configured for separating the meal or beverage items between the medial container 14 and the second container 12.

The first medial lid 24 and the second medial lid 26 are configured for removable attachment. If a user desires to have more space within the portable multi-compartment storage container 10, or if the user wishes to hold fewer different items, the user can remove the lids 24, 26.

Illustrated in FIG. 2 are the tab 32 for attaching the handle (not shown) attached to the first container 12 and second container 16. The tabs 32 are preferably attached to the bottle necks 13, 17 for preferred stability. In alternate embodiments the tabs can be positioned on different locations on the first container 12 and second container 16.

Figure 3:
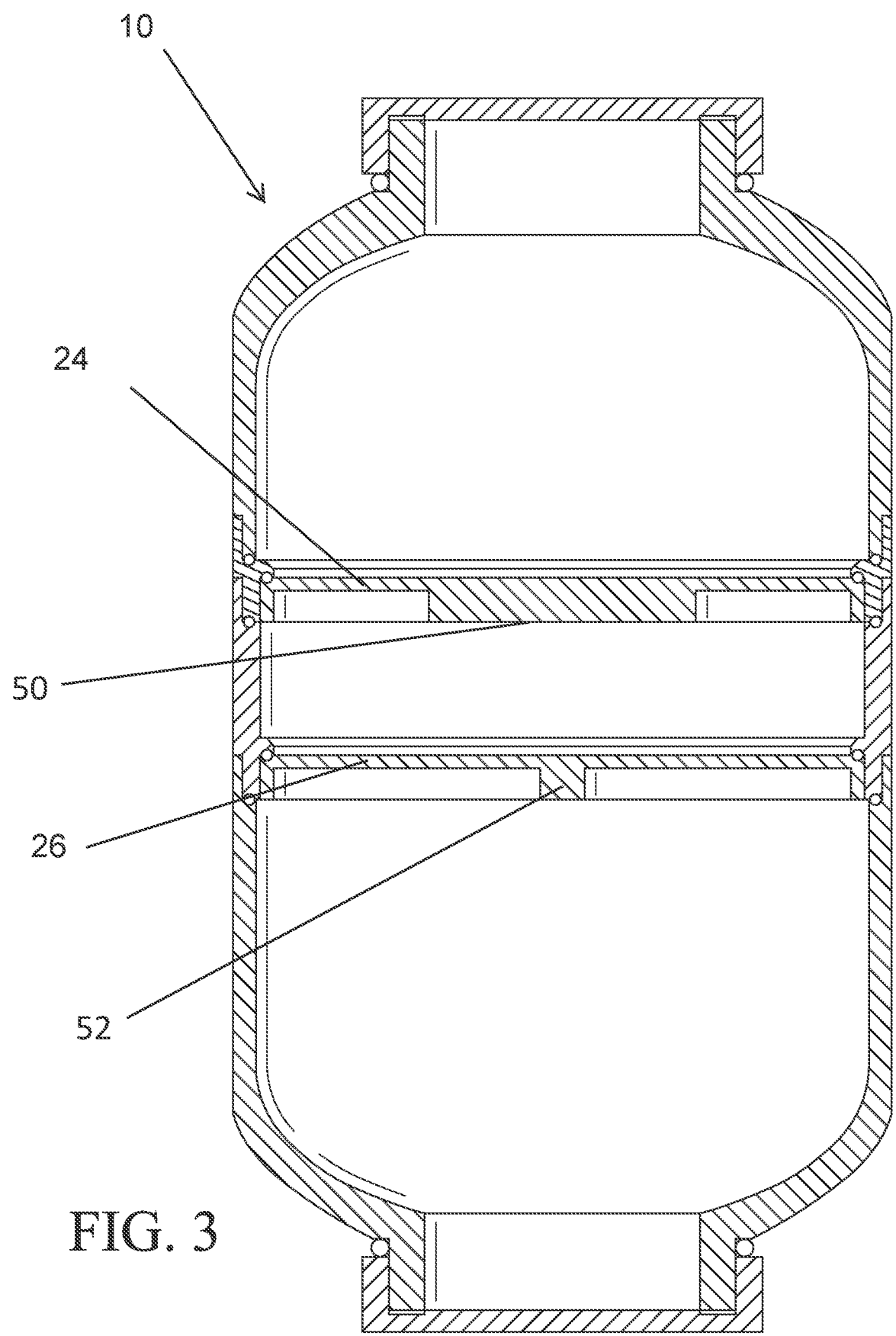
FIG. 3 is a side cross sectional view of the portable multi-compartment storage container as shown in FIG. 1.

FIG. 3 illustrates a side cross sectional view of a preferred embodiment of an portable multi-compartment storage container 10. The medial lids 24, 26 are preferably generally planar. In alternate embodiments the medial lids are configured to extend within the first container and second container, respectively. The first medial lid 24 optionally has a handle 50. The handle 50 can be formed as an integral part of the first medial lid 24. Similarly, the second medial lid 26 optionally has a handle 52. The handle 52 can be formed as an integral part of the second medial lid 26.

Figure 4:
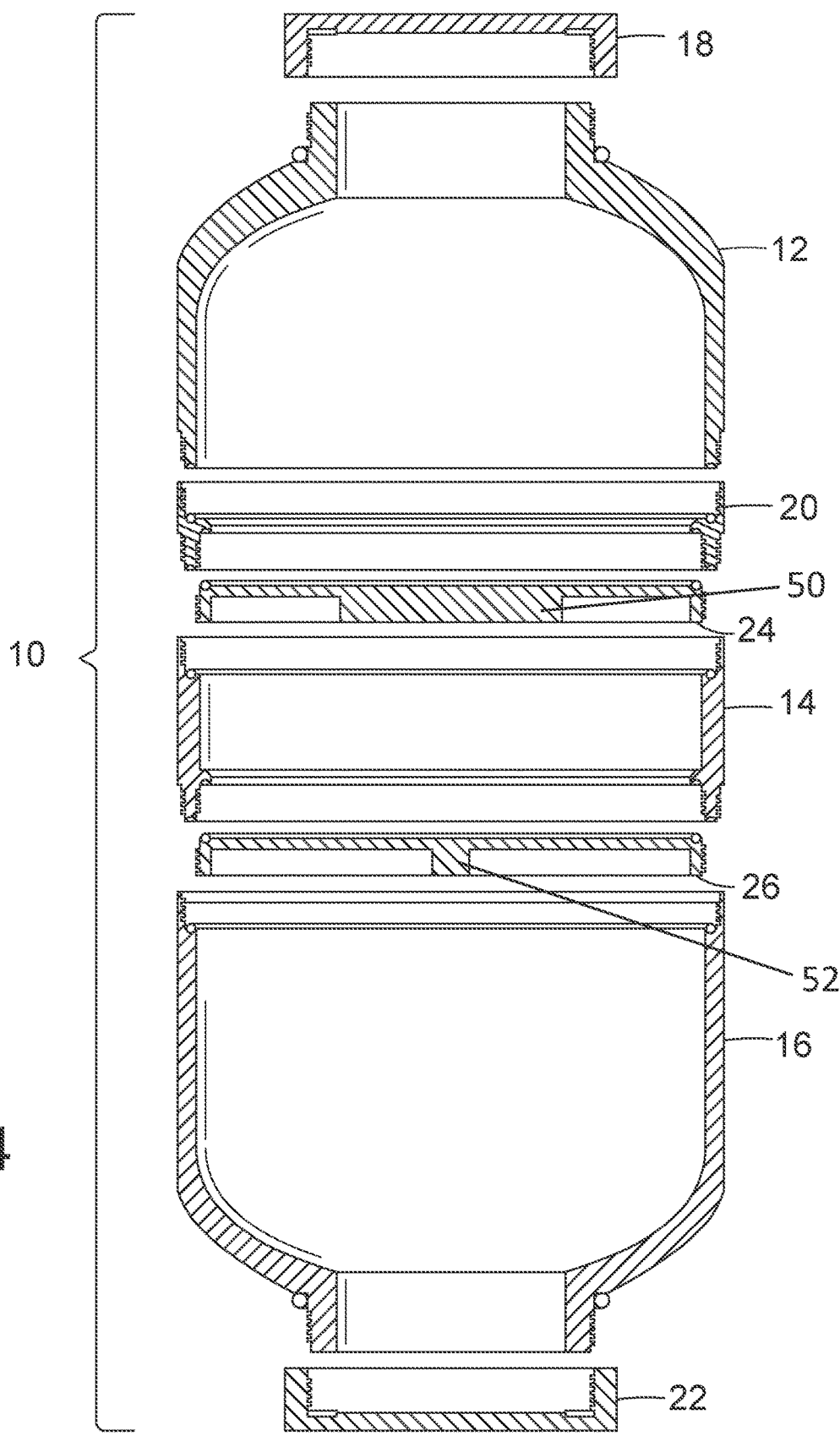
FIG. 4 is side cross sectional exploded view of the portable multi-compartment storage container as shown in FIG. 1.
Figure 5:
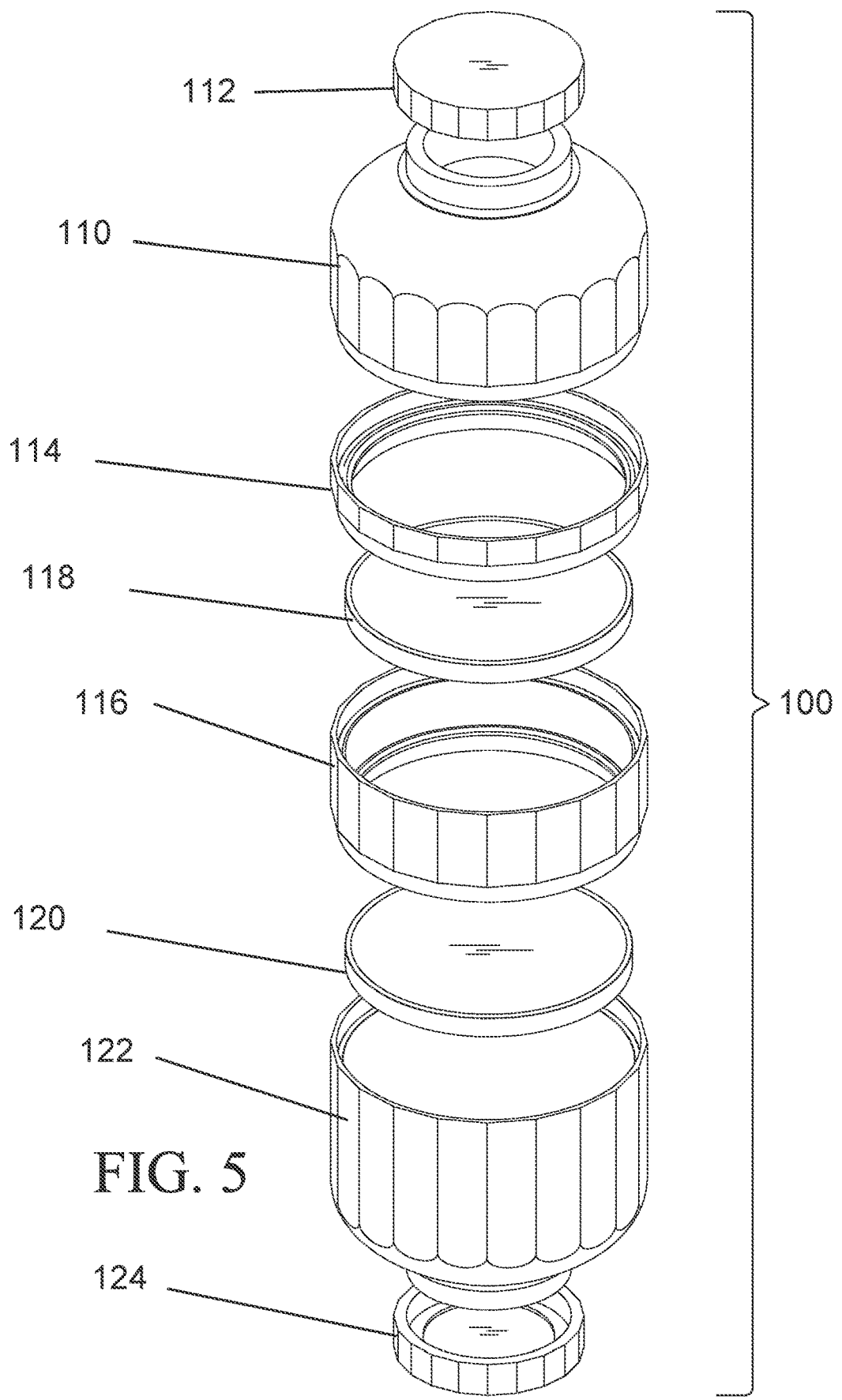
FIG. 5 is a side perspective exploded view of an embodiment of an portable multi-compartment storage container.
Figure 6:
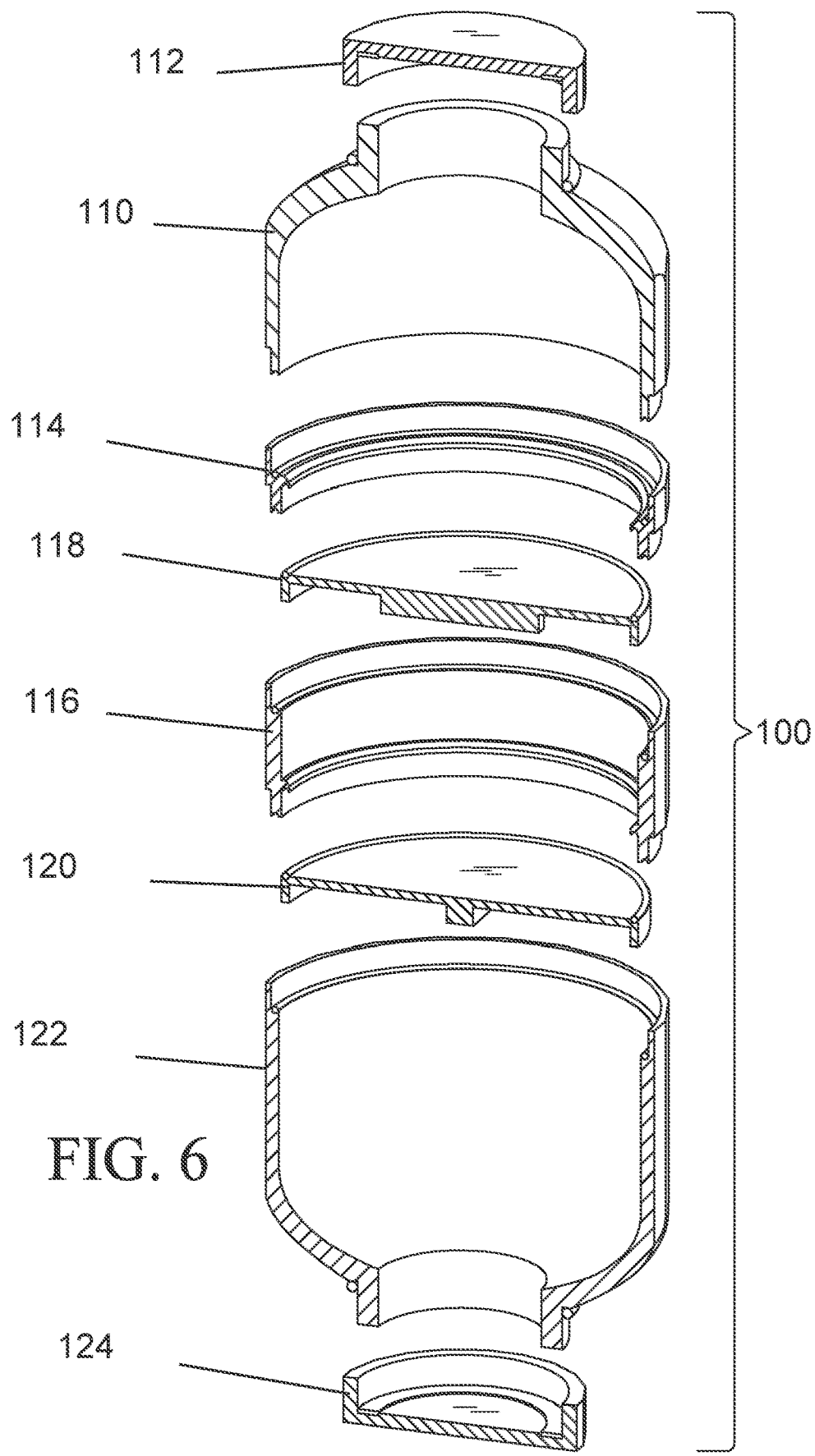
FIG. 6 is a side cross sectional exploded view of the portable multi-compartment storage container as shown in FIG. 5.

FIG. 4 illustrates an exploded cross sectional view of a preferred embodiment of the portable multi-compartment storage container. In a preferred embodiment, the portable multi-compartment storage container attaches by threading engagements as illustrated in FIG. 4. The threading engagements are configured so that if a portion of the portable multi-compartment storage container 10 is removed, the remaining components can attach, allowing the portable multi-compartment storage container to still store meal items or beverages. In a preferred embodiment, the threading engagements of the first container 12 is configured to attach the medial connector 20. The threading engagements of the first container are configured to attach to the medial container 14 when the medial connector 20 is removed. The threading engagements of the first container 12 are configured to attach to the threading engagements of the second container 16 if the medial container 14 and medial connector 20 are removed. The first medial lid 24 is configured to insert into the medial connector 20 by threaded engagement. The second medial lid 26 is configured to insert into the medial container 14 by threaded engagement proximate to the attachment of the medial container 14 and the second container 16. The lids 18, 22 are configured to attach to the first container 12 and second container 16, respectively, by threaded engagement.

The first medial lid is configured to be removably attached and used as a plate by a user. The medial lid and the medial connector are configured such that a user can remove the medial lid and the medial connector such that the user has a shallow bowl.

Illustrated in FIG. 5-8 an alternate embodiment of the portable multi-compartment storage container 100. In this alternate embodiment, the first container 110 is configured to attach a lid 112 by a force fit engagement. The first container 110 is configured to attach a medial connector 114 by a force fit engagement. The medial connector 114 is configured to attach the medial container 116 by a force fit engagement. A first medial lid 118 is configured to insert into the bottom of the medial connector 114 and securely attach by a force fit engagement. A second medial lid 120 is configured to insert into the bottom of the medial container 116 by force fit engagement. The medial container 116 is configured to attach to the second container 122 by force fit engagement. The second container 122 is configured to attach a lid 124 by force fit engagement.

Figure 7:
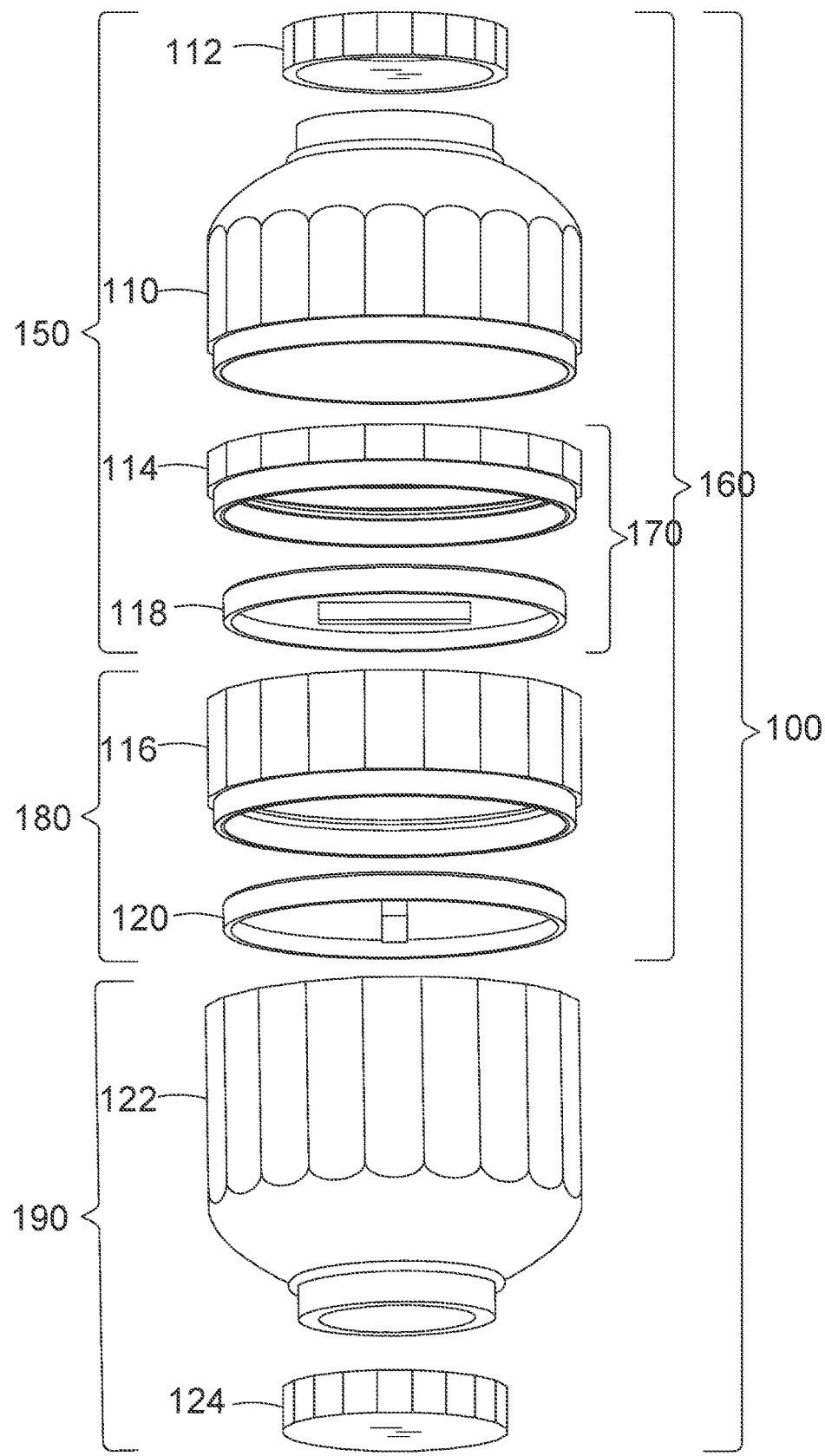
FIG. 7 is a side perspective exploded view of the portable multi-compartment storage container as shown in FIG. 5.
Figure 8:
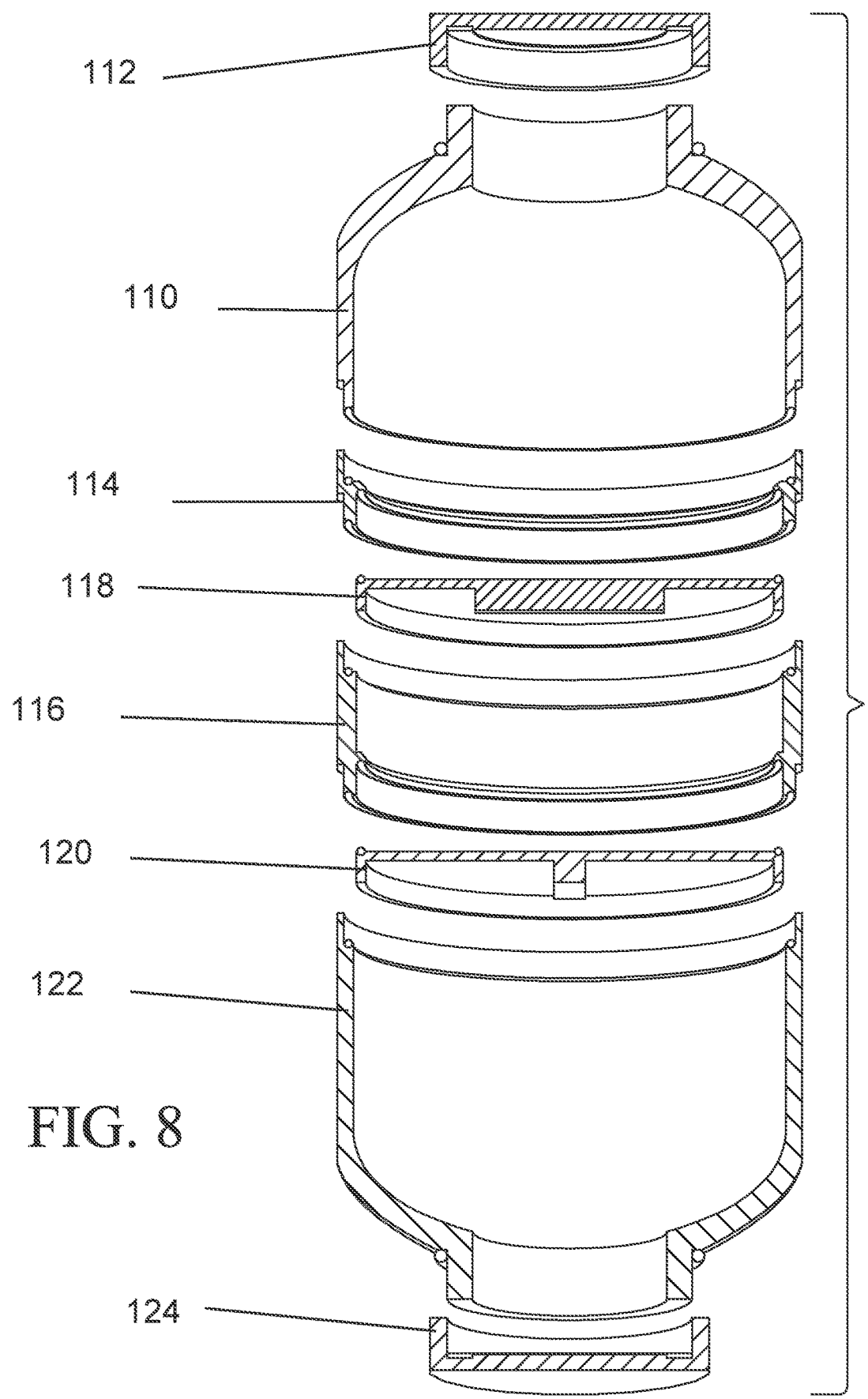
FIG. 8 is a side cross sectional exploded view of an portable multi-compartment storage container.

FIG. 7 illustrates the subassembly arrangement of the portable-multi-compartment storage container 100. The first container 110 is configured to attach the medial connector 114, the first medial lid 118, and the lid 112 to make a top container 150. The first container 110, the medial connector 114, the medial container 116, and the medial lids 118, 120 are configured to make a second portable container 160. The medial connector 114 and first medial lid 118 are configured to attach to make a transportable dish 170, preferably in the shape of a small bowl or plate. The medial container 116 is configured to attach the second medial lid 120 to make a medium sized bowl 180 or open topped container. The second container 122 is configured to attach the lid 124 to make a large bowl 190.

Preferably, the portable multi-compartment storage container is made of resilient plastic or stainless steel (for better insulation). In alternate embodiments, other metals, including but not limited to aluminum or other resilient materials known in the art, can be used.

The portable multi-compartment storage container is preferably configured to be adjustable and interchangeable. The first container is configured to attach the medial connector, the medial container when the medial connector is removed, and the second container when the medial connector and the medial container are removed. The medial connector is configured to attach the second container when the medial container is removed. A user can utilize all three containers, two containers, or a single container by having only the first a container and second container attached or the first container and medial container attached without any medial lids inserted therein.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

I claim:

1. A portable multi-compartment storage container for meals and beverages, said portable multi-compartment storage container comprising:
    a first container, said first container comprising a first end, a second end, and a first container lid, wherein said first end defines a first opening, wherein said first container is in the shape of a bowl, said bowl shape of said first container having a perimeter curving inwards in the direction of said first end of said first container such that a diameter of said first opening of said first end of said first container is less than a diameter of said second end of said first container, wherein said first container lid is configured for removable attachment to said first end of said first container and configured to cover said first opening of said first container, wherein said second end of said first container defines a second opening;
    a medial container, wherein said medial container comprises a first end and a second end;
    a second container, said second container comprising a first end, a second end, and a second container lid, wherein said first end of said second container defines a first opening, wherein said second container is in the shape of a bowl, said bowl shape of said second container having a perimeter curving inwards in the direction of said first end of said second container such that a diameter of said first opening of said first end of said second container is less than a diameter of said second end of said second container, wherein said second container lid is configured for removable attachment to said first end of said second container and to cover said first opening of said second container, wherein said second end of said second container defines a second opening, wherein said second end of said second container is configured for attaching to said second end of said medial container;
    a medial connector, wherein said medial connector is configured for attaching said second end of said first container to said first end of said medial container;
    a first medial lid, wherein said first medial lid is configured for inserting in said medial connector such that said first container is separated from said medial container when said medial container is attached, wherein said first medial lid is configured to attach to an interior of said medial connector such that said first medial lid is completely enclosed by said medial connector, wherein said first medial lid is configured for separating said first container from said second container when said medial container is removed;
    a second medial lid, wherein said second medial lid is configured for inserting in said second end of said medial container such that said medial container is separated from said second container;
    a handle, wherein said handle is configured to removably attach to said first container, said medial connector and said second container;
    wherein said first container, said medial container, and said second container are configured for holding food items and beverages.

2. The portable multi-compartment storage container of claim 1, wherein said handle comprises a plurality of tabs and a strap, wherein said strap is attached to said plurality of tabs, wherein said plurality of tabs are attached to said first container, said medial connector, and said second container.

3. The portable multi-compartment storage container of claim 1, wherein said first end and said second end of said first container comprise threads configured for threaded attachment to said first container lid and said medial connector.

4. The portable multi-compartment storage container of claim 1, wherein said first end and said second end of said medial container comprise threads configured for threaded attachment to said medial connector and said second container.

5. The portable multi-compartment storage container of claim 1, wherein said first end and said second end of said second container comprise threads configured for threaded attachment to said second container lid and said medial container.

6. The portable multi-compartment storage container of claim 1, wherein said first medial lid comprises threads configured for threaded attachment to an interior of said medial connector, wherein said second medial lid comprises threads configured for threaded attachment to said medial container.

7. The portable multi-compartment storage container of claim 1, wherein said first medial lid and medial connector are configured for removal, wherein said first medial lid and said medial connector are configured for use as an eating dish.

8. The portable multi-compartment storage container of claim 1, wherein said first medial lid further comprises a first handle, wherein said first handle is integral to said first medial lid; and said second medial lid further comprises a second handle, wherein said second handle is integral to said second medial lid.

9. A portable multi-compartment storage container for meals and beverages, said portable multi-compartment storage container comprising:
    a first container, said first container comprising a first end, a second end, and a first container lid, wherein said first end of said first container defines an opening, wherein said first container lid is configured for removable attachment to said first end of said first container and to cover said opening of said first container;

a medial container, wherein said medial container comprises a first end and a second end a second container, said second container comprising a first end, a second end, and a second container lid, wherein said first end of said second container defines an opening, wherein said second container lid is configured for removable attachment to said first end of said second container and to cover said opening of said second container, wherein said second end of said second container is configured for attaching to said second end of said medial container;

a medial connector, wherein said medial connector is configured for attaching said second end of said first container to said first end of said medial container, wherein said medial connector is configured for attaching said second end of said second container when said medial container is removed, wherein said first end of said medial container is configured for attaching to said second end of said first container when said medial connector is removed;

a first medial lid, wherein said first medial lid is configured for inserting in said medial connector such that said first container is separated from said medial container when said medial container is attached, wherein said first medial lid is configured to attach to an interior of said medial connector, wherein said first medial lid is configured for separating said first container from said second container when said medial container is removed;

a second medial lid, wherein said second medial lid is configured for inserting in said second end of said medial container such that said medial container is separated from said medial connector;

a handle, wherein said handle comprises a plurality of tabs and a strap, wherein said strap is attached to said plurality of tabs, wherein said plurality of tabs are attached to said first container, said medial container, and said second container;

wherein said first container is configured to attach said medial container when said medial connector is removed and said first container is configured to attach to said second container when said medial connector and said medial container are removed;

wherein said medial connector is configured for attaching said second end of said second container and said second end of said medial container;

wherein said first container, said medial container, and said second container are configured for holding food items and beverages.

10. The portable multi-compartment storage container of claim 9, wherein said first end and said second end of said first container comprise threads configured for threaded attachment to said first container lid and said medial connector.

11. The portable multi-compartment storage container of claim 9, wherein said first end and said second end of said medial container comprise threads configured for threaded attachment to said medial connector and said second container.

12. The portable multi-compartment storage container of claim 9, wherein said first end and said second end of said second container comprise threads configured for threaded attachment to said second container lid and said medial container.

13. The portable multi-compartment storage container of claim 9, wherein said first medial lid comprises threads configured for threaded attachment to an interior of said medial connector, wherein said second medial lid comprises threads configured for threaded attachment to said medial container.

14. The portable multi-compartment storage container of claim 9, wherein said first medial lid, said second medial lid and said medial connector are configured for removal, wherein said first medial lid, said second medial lid and said medial connector are configured for use as independent dishes.

15. The portable multi-compartment storage container of claim 9, wherein said first container is in the shape of a bowl, said bowl shape of said first container having a perimeter curving inwards in the direction of said first end of said first container such that a diameter of said opening of said first end of said first container is less than a diameter of said second end of said first container, and wherein said second container is in the shape of a bowl, said bowl shape of said second container having a perimeter curving inwards in the direction of said first end of said second container such that a diameter of said opening of said first end of said second container is less than a diameter of said second end of said second container.

16. The portable multi-compartment storage container of claim 15, wherein said bowl shaped first container and said bowl shaped second container are different sizes.

* * * * *